United States Patent
Gardner et al.

(10) Patent No.: US 11,135,840 B2
(45) Date of Patent: Oct. 5, 2021

(54) FLUID EJECTION DIES INCLUDING STRAIN GAUGE SENSORS

(71) Applicant: HEWLETT-PACKARD DEVELOPMENT COMPANY, L.P., Spring, TX (US)

(72) Inventors: James Gardner, Corvallis, OR (US); Berkeley Fisher, Corvallis, OR (US); Andrew Koll, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/490,838

(22) PCT Filed: Apr. 24, 2017

(86) PCT No.: PCT/US2017/029126
§ 371 (c)(1),
(2) Date: Sep. 3, 2019

(87) PCT Pub. No.: WO2018/199891
PCT Pub. Date: Nov. 1, 2018

(65) Prior Publication Data
US 2020/0031127 A1  Jan. 30, 2020

(51) Int. Cl.
*B41J 2/14* (2006.01)

(52) U.S. Cl.
CPC .................. *B41J 2/14153* (2013.01)

(58) Field of Classification Search
None
See application file for complete search history.

(56) References Cited

U.S. PATENT DOCUMENTS

| 4,125,845 | A | 11/1978 | Stevenson, Jr. |
| 4,777,497 | A | 10/1988 | Nozu et al. |
| 4,930,353 | A * | 6/1990 | Kato .......... G01L 9/06 338/4 |
| 6,398,329 | B1 | 6/2002 | Boyd et al. |
| 6,474,769 | B1 | 11/2002 | Imanaka et al. |
| 6,739,199 | B1 | 5/2004 | Nikkel |
| 6,789,872 | B2 * | 9/2004 | Ioka ............ B41J 2/04505 347/19 |
| 7,567,374 | B2 * | 7/2009 | Griffith .......... G02B 26/06 359/198.1 |

(Continued)

FOREIGN PATENT DOCUMENTS

| CN | 1753788 | 3/2006 |
| CN | 102905903 | 1/2013 |

(Continued)

OTHER PUBLICATIONS

Rippie, et al., Viscoelastic Stress / Strain Behavior of Pharmaceutical Tablets: Analysis During Unloading and Postcompression Periods. May 15, 1980.

*Primary Examiner* — Alejandro Valencia
(74) *Attorney, Agent, or Firm* — Dicke Billig & Czaja PLLC

(57) ABSTRACT

A fluid ejection system includes a fluid ejection die and a controller. The fluid ejection die includes a plurality of nozzles to eject fluid drops and a plurality of strain gauge sensors to sense strain within the fluid ejection die. The controller is to receive the sensed strain from each strain gauge sensor to determine a status of the fluid ejection die.

20 Claims, 6 Drawing Sheets

(56) References Cited

U.S. PATENT DOCUMENTS

| | | |
|---|---|---|
| 7,878,632 B2 | 2/2011 | Kachi |
| 8,789,932 B2 | 7/2014 | Van Brocklin et al. |
| 9,333,060 B2 | 5/2016 | Hunter |
| 9,643,406 B2 | 5/2017 | Gengrinovich et al. |
| 10,099,477 B2 | 10/2018 | Edelen et al. |
| 2007/0279446 A1 | 12/2007 | Ishizaki |
| 2009/0279912 A1 | 11/2009 | Jones et al. |
| 2011/0292127 A1* | 12/2011 | Oohashi ............... B41J 2/0458 347/50 |
| 2013/0155142 A1* | 6/2013 | Browning ............ B41J 2/14145 347/19 |
| 2016/0243825 A1 | 8/2016 | Kamiyanagi |
| 2016/0250847 A1 | 9/2016 | Gengrinovich et al. |

FOREIGN PATENT DOCUMENTS

| | | | |
|---|---|---|---|
| CN | 103963468 | 8/2014 | |
| CN | 105700291 | 6/2016 | |
| CN | 105873765 | 8/2016 | |
| CN | 106487388 | 3/2017 | |
| EP | 1057634 | 12/2000 | |
| EP | 1457766 | 5/2013 | |
| JP | 58131071 | 8/1983 | |
| JP | 06218942 | 8/1994 | |
| JP | 2004271527 | 9/2004 | |
| JP | 2007112033 A | 5/2007 | |
| JP | 2009000816 | 1/2009 | |
| JP | 2012143934 | 8/2012 | |
| WO | WO-2010089234 | 8/2010 | |
| WO | WO-2010089234 A1 * | 8/2010 | .......... B41J 2/14233 |
| WO | WO-2017018973 | 2/2017 | |

* cited by examiner

FLUID EJECTION DIES INCLUDING STRAIN GAUGE SENSORS

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Die fragility and the contributing factors to fluid ejection die failures are difficult to monitor. Accordingly, a fluid ejection system disclosed herein includes a fluid ejection die including a plurality of nozzles to eject fluid drops and a plurality of strain gauge sensors to sense strain. The strain gauge sensors sense strain at various locations within the fluid ejection die to determine a status of the fluid ejection die. In one example, each strain gauge sensor is coupled to a biasing circuit and to an analog to digital converter such that the strain from each strain gauge sensor may be sensed simultaneously. In another example, each strain gauge sensor is coupled to an analog multiplexor, which is coupled to a biasing circuit and an analog to digital converter such that the strain from a selected strain gauge sensor may be sensed.

Figure 1A:
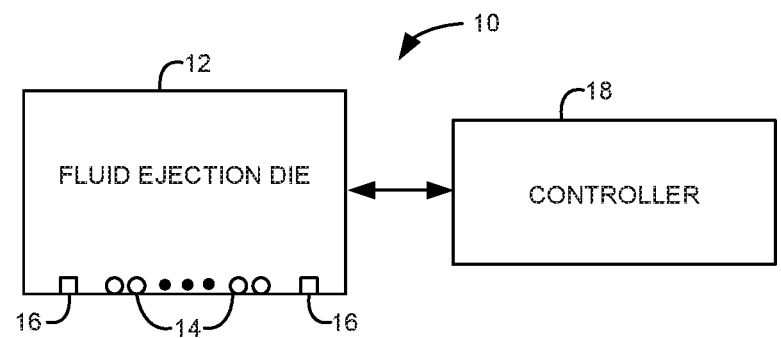
FIG. 1A is a block diagram illustrating one example of a fluid ejection system.

FIG. 1A is a block diagram illustrating one example of a fluid ejection system. Fluid ejection system 10 includes a fluid ejection die 12 and a controller 18. Fluid ejection die 12 includes a plurality of nozzles 14 to eject fluid drops and a plurality of strain gauge sensors 16 to sense strain within the fluid ejection die 12. Controller 18 receives the sensed strain from each strain gauge sensor 16 to determine a status of the fluid ejection die 12. The status of fluid ejection die 12 may include a strain profile or stress signature of fluid ejection die 12 indicating a fluid ejection die flatness and/or fragility.

Figure 1B:
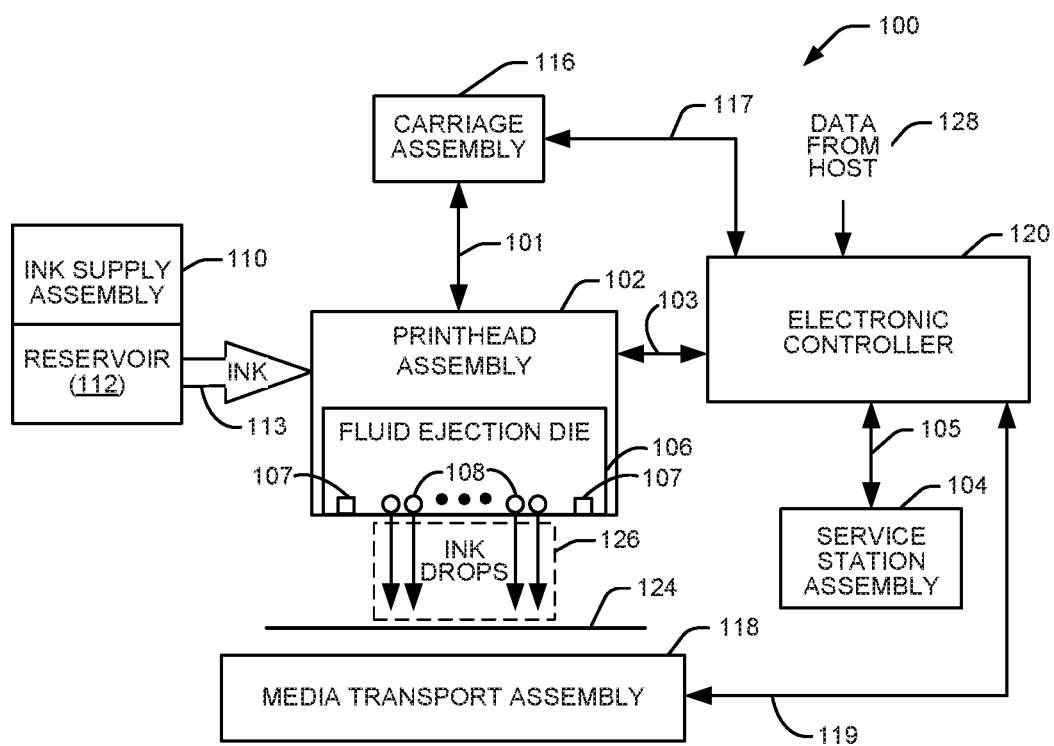
FIG. 1B is a block diagram illustrating another example of a fluid ejection system.

FIG. 1B is a block diagram illustrating another example of a fluid ejection system 100. Fluid ejection system 100 includes a fluid ejection assembly, such as printhead assembly 102, and a fluid supply assembly, such as ink supply assembly 110. In the illustrated example, fluid ejection system 100 also includes a service station assembly 104, a carriage assembly 116, a print media transport assembly 118, and an electronic controller 120. While the following description provides examples of systems and assemblies for fluid handling with regard to ink, the disclosed systems and assemblies are also applicable to the handling of fluids other than ink.

Printhead assembly 102 includes at least one printhead or fluid ejection die 106 which ejects drops of ink or fluid through a plurality of orifices or nozzles 108. In one example, the drops are directed toward a medium, such as print media 124, so as to print onto print media 124. In one example, print media 124 includes any type of suitable sheet material, such as paper, card stock, transparencies, Mylar, fabric, and the like. In another example, print media 124 includes media for three-dimensional (3D) printing, such as a powder bed, or media for bioprinting and/or drug discovery testing, such as a reservoir or container. In one example, nozzles 108 are arranged in at least one column or array such that properly sequenced ejection of ink from nozzles 108 causes characters, symbols, and/or other graphics or images to be printed upon print media 124 as printhead assembly 102 and print media 124 are moved relative to each other.

Fluid ejection die 106 also includes a plurality of strain gauge sensors 107. The strain gauge sensors 107 sense strain within fluid ejection die 106. In one example, strain gauge sensors 107 enable fluid ejection system 100 to monitor the stress experienced by fluid ejection die 106. Each strain gauge sensor 107 exhibits changes in electrical conductivity when corresponding areas of fluid ejection die 106 are stressed. The amount of stress is quantified by measuring the changes in conductivity. By analyzing the stress at each corresponding area of fluid ejection die 106, numerous diagnostics may be performed.

Ink supply assembly 110 supplies ink to printhead assembly 102 and includes a reservoir 112 for storing ink. As such, in one example, ink flows from reservoir 112 to printhead assembly 102. In one example, printhead assembly 102 and ink supply assembly 110 are housed together in an inkjet or fluid-jet print cartridge or pen. In another example, ink supply assembly 110 is separate from printhead assembly 102 and supplies ink to printhead assembly 102 through an interface connection 113, such as a supply tube and/or valve.

Carriage assembly 116 positions printhead assembly 102 relative to print media transport assembly 118 and print media transport assembly 118 positions print media 124 relative to printhead assembly 102. Thus, a print zone 126 is defined adjacent to nozzles 108 in an area between printhead assembly 102 and print media 124. In one example, printhead assembly 102 is a scanning type printhead assembly such that carriage assembly 116 moves printhead assembly 102 relative to print media transport assembly 118. In another example, printhead assembly 102 is a non-scanning type printhead assembly such that carriage assembly 116 fixes printhead assembly 102 at a prescribed position relative to print media transport assembly 118.

Service station assembly 104 provides for spitting, wiping, capping, and/or priming of printhead assembly 102 to maintain the functionality of printhead assembly 102 and, more specifically, nozzles 108. For example, service station assembly 104 may include a rubber blade or wiper which is periodically passed over printhead assembly 102 to wipe and clean nozzles 108 of excess ink. In addition, service station assembly 104 may include a cap that covers printhead assembly 102 to protect nozzles 108 from drying out during periods of non-use. In addition, service station assembly 104 may include a spittoon into which printhead assembly 102 ejects ink during spits to insure that reservoir 112 maintains an appropriate level of pressure and fluidity, and to insure that nozzles 108 do not clog or weep. Functions of service station assembly 104 may include relative motion between service station assembly 104 and printhead assembly 102.

Electronic controller 120 communicates with printhead assembly 102 through a communication path 103, service station assembly 104 through a communication path 105, carriage assembly 116 through a communication path 117, and print media transport assembly 118 through a communication path 119. In one example, when printhead assembly 102 is mounted in carriage assembly 116, electronic controller 120 and printhead assembly 102 may communicate via carriage assembly 116 through a communication path 101. Electronic controller 120 may also communicate with ink supply assembly 110 such that, in one implementation, a new (or used) ink supply may be detected.

Electronic controller 120 receives data 128 from a host system, such as a computer, and may include memory for temporarily storing data 128. Data 128 may be sent to fluid ejection system 100 along an electronic, infrared, optical or other information transfer path. Data 128 represent, for example, a document and/or file to be printed. As such, data 128 form a print job for fluid ejection system 100 and includes at least one print job command and/or command parameter.

In one example, electronic controller 120 provides control of printhead assembly 102 including timing control for ejection of ink drops from nozzles 108. As such, electronic controller 120 defines a pattern of ejected ink drops which form characters, symbols, and/or other graphics or images on print media 124. Timing control and, therefore, the pattern of ejected ink drops, is determined by the print job commands and/or command parameters. In one example, logic and drive circuitry forming a portion of electronic controller 120 is located on printhead assembly 102. In another example, logic and drive circuitry forming a portion of electronic controller 120 is located off printhead assembly 102.

Electronic controller 120 also receives the sensed strain from each of the plurality of strain gauge sensors 107 to determine the status of fluid ejection die 106. The status of fluid ejection die 106 may include a strain profile or stress signature of fluid ejection die 106 indicating a fluid ejection die flatness and/or fragility. Electronic controller 120 may use the sensed strain from each of the plurality of strain gauge sensors 107 for numerous purposes, such as to control operations of fluid ejection system 100 or to alert a user of fluid ejection system 100 about the status of fluid ejection die 106.

Figure 2:
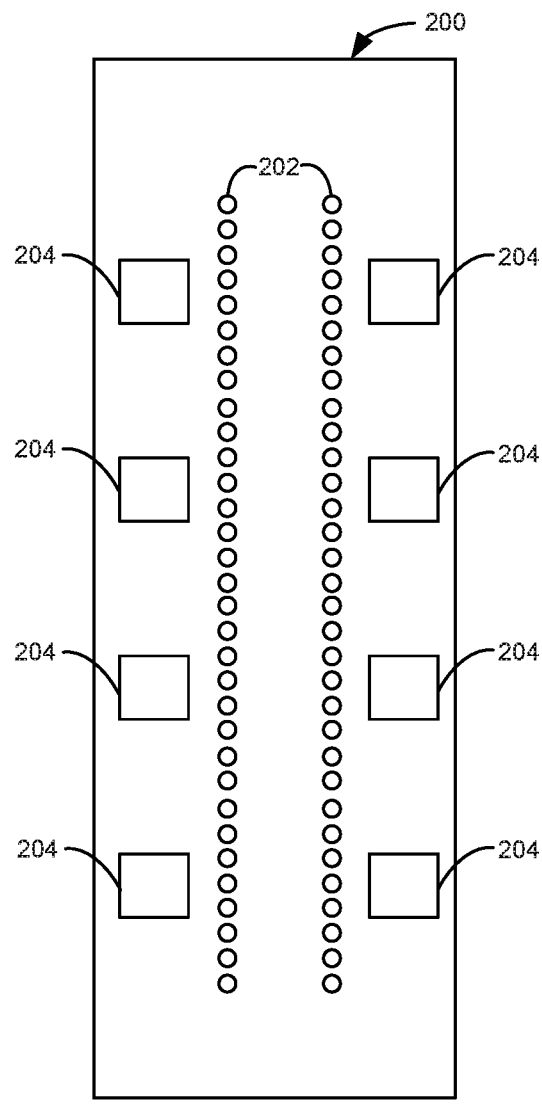
FIG. 2 illustrates a front view of one example of a fluid ejection die.

FIG. 2 illustrates a front view of one example of a fluid ejection die 200. In one example, fluid ejection die 200 provides fluid ejection die 12 previously described and illustrated with reference to FIG. 1A or fluid ejection die 106 previously described and illustrated with reference to FIG. 1B. Fluid ejection die 200 includes a plurality of nozzles 202 and a plurality of strain gauge sensors 204. In one example, fluid ejection die 200 is a silicon die and each of the plurality of strain gauge sensors 204 is integrated within the die. Each strain gauge sensor 204 senses the strain within fluid ejection die 200 at a unique location within fluid ejection die 200.

While fluid ejection die 200 includes a rectangular shape in this example, in other examples fluid ejection die 200 may have another suitable shape, such as a square shape. Fluid ejection die 200 may include any suitable number of nozzles 202 and any suitable number of strain gauge sensors 204. While fluid ejection die 200 includes nozzles 202 arranged in two columns and strain gauge sensors 204 arranged in two columns parallel to the two columns of nozzles, in other examples nozzles 202 and strain gauge sensors 204 may have other suitable arrangements, such as one column of nozzles and/or one column of strain gauge sensors or more than two columns of nozzles and/or more than two columns of strain gauge sensors. Also, while fluid ejection die 200 includes strain gauge sensors 204 aligned with respect to each other, in other examples, strain gauge sensors 204 may be staggered with respect to each other. In other examples, fluid ejection die 200 may include strain gauge sensors 204 between the two columns of nozzles 202.

Figure 3:
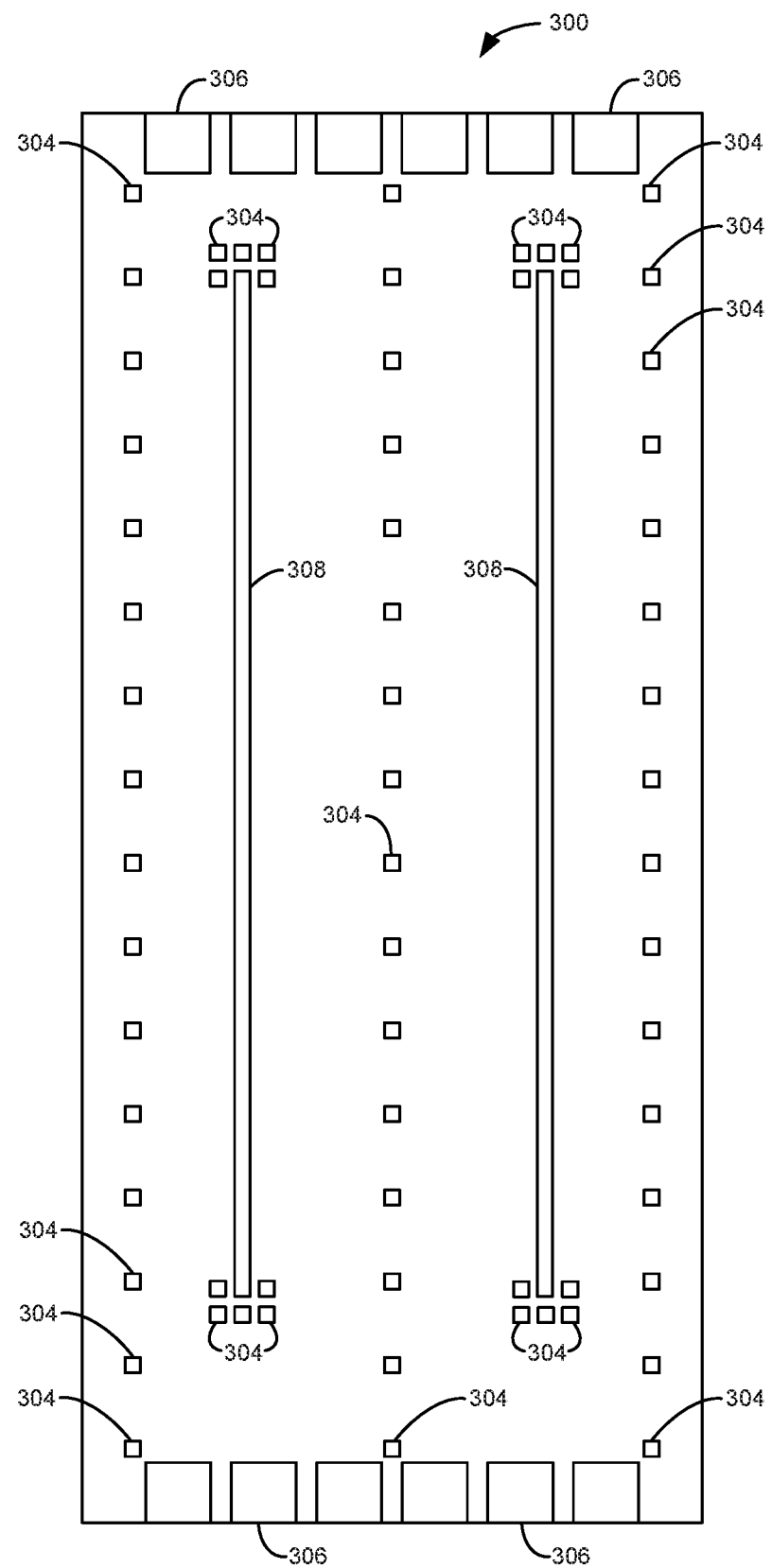
FIG. 3 illustrates a front view of another example of a fluid ejection die.

FIG. 3 illustrates a front view of another example of a fluid ejection die 300. In one example, fluid ejection die 300 provides fluid ejection die 12 previously described and illustrated with reference to FIG. 1A or fluid ejection die 106 previously described and illustrated with reference to FIG. 1B. Fluid ejection die 300 includes a plurality of strain gauge sensors 304, a plurality of bond pads 306, and a plurality of slots 308. Each slot 308 delivers fluid to a plurality of corresponding nozzles (not shown) adjacent to each slot 308. In one example, fluid ejection die 300 is a silicon die and each of the plurality of strain gauge sensors 304 is integrated within the die. Each strain gauge sensor 304 senses the strain within fluid ejection die 300 at a unique location within fluid ejection die 300.

A plurality of strain gauge sensors 304 may be arranged in at least one column (e.g., three in this example) parallel to slots 308. In this example, one column of strain gauge sensors 304 is arranged between slots 308 in the center of fluid ejection die 300, and two columns of strain gauge sensors 304 are arranged on opposing sides of fluid ejection die 300. Strain gauge sensors 304 distributed throughout fluid ejection die 300 may be used to determine a strain profile or stress signature across fluid ejection die 300.

Slots 308 are arranged along the length of fluid ejection die 300 between bond pads 306. A first plurality of strain gauge sensors 304 surround a first end of each slot 308, and a second plurality of strain gauge sensors 304 surround a second end of each slot 308. In this example, five strain gauge sensors 304 surround each end of each slot 308. The ends of slots 308 are high stress regions within fluid ejection die 300 due to the silicon slotting process used to form the slots. The strain gauge sensors 304 surrounding the ends of each slot 308 monitor these regions to determine the status of fluid ejection die 300.

Bond pads 306 are arranged on a first end of fluid ejection die 300 and on a second end of fluid ejection die 300 opposite to the first end. In another example, bond pads 306 are also arranged on the side of fluid ejection die 300 instead of or in addition to the top of fluid ejection die 300. Bond pads 306 electrically couple fluid ejection die 300 to a fluid ejection system when fluid ejection die 300 is installed in the system. A plurality of strain gauge sensors 304 are proximate bond pads 306. In this example, six strain gauge sensors 304 are proximate bond pads 306 (i.e., three strain gauge sensors 304 proximate bond pads 300 on the first end of fluid ejection die 300 and three strain gauge sensors 304 proximate bond pads 300 on the second end of fluid ejection die 300). Bond pads 306 are high stress regions within fluid ejection die 300 due to electrical interconnects, bond pad encapsulants, and bond pad adhesives. The strain gauge sensors 304 proximate the bond pads 306 monitor these regions to determine the status of fluid ejection die 300. In other examples, strain gauge sensors 304 may be arranged at various other locations within fluid ejection die 300.

Figure 4A:
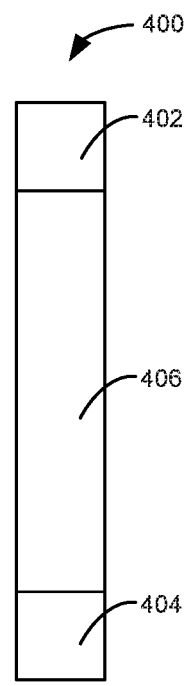
FIG. 4A illustrates one example of a strain gauge sensor.

FIG. 4A illustrates one example of a strain gauge sensor 400. In one example, strain gauge sensor 400 provides each strain gauge sensor 204 of fluid ejection die 200 previously described and illustrated with reference to FIG. 2 or each strain gauge sensor 304 of fluid ejection die 300 previously described and illustrated with reference to FIG. 3. Strain gauge sensor 400 includes a first electrode 402, a second electrode 404, and a piezoelectric sensor element 406 electrically coupled between first electrode 402 and second electrode 404. Piezoelectric sensor element 406 exhibits a change in resistance in response to stress in one axis. Therefore, by biasing strain gauge sensor 400 with a constant current and measuring the voltage across piezoelectric sensor element 406 or by biasing strain gauge sensor 400 with a constant voltage and measuring the current through piezoelectric sensor element 406, the strain on piezoelectric sensor element 406 may be sensed.

Figure 4B:
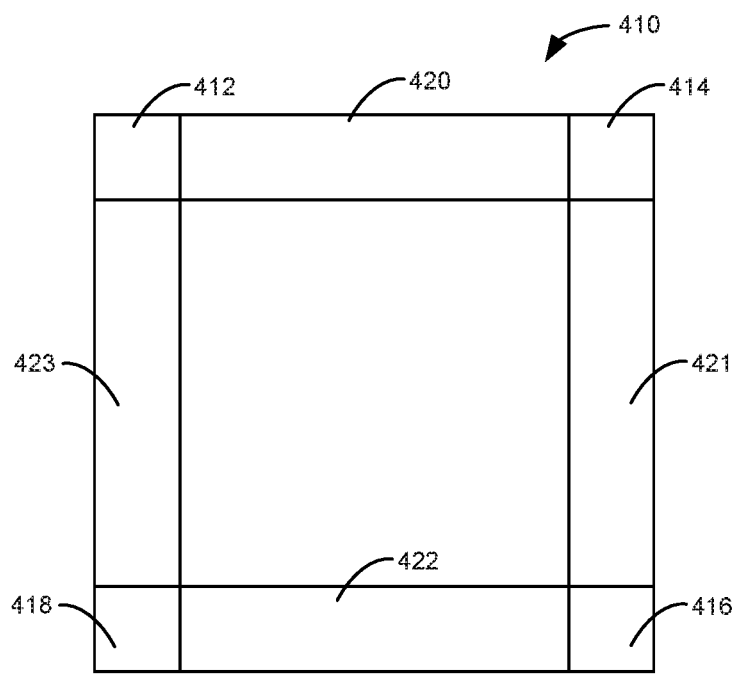
FIG. 4B illustrates another example of a strain gauge sensor.

FIG. 4B illustrates another example of a strain gauge sensor 410. In one example, strain gauge sensor 410 provides each strain gauge sensor 204 of fluid ejection die 200 previously described and illustrated with reference to FIG. 2 or each strain gauge sensor 304 of fluid ejection die 300 previously described and illustrated with reference to FIG. 3. Strain gauge sensor 410 includes a first electrode 412, a second electrode 414, a third electrode 416, a fourth electrode 418, a first piezoelectric sensor element 420, a second piezoelectric sensor element 421, a third piezoelectric sensor element 422, and a fourth piezoelectric sensor element 423. First piezoelectric sensor element 420 is electrically coupled between first electrode 412 and second electrode 414. Second piezoelectric sensor element 421 is electrically coupled between second electrode 414 and third electrode 416. Third piezoelectric sensor element 422 is electrically coupled between third electrode 416 and fourth electrode 418. Fourth piezoelectric sensor element 423 is electrically coupled between fourth electrode 418 and first electrode 412.

Strain gauge sensor 410 exhibits a change in resistance in response to stress in two axes. Strain gauge sensor 410 is configured in a Wheatstone bridge configuration in which an external biasing voltage is applied across two opposing electrodes (e.g., first electrode 412 and third electrode 416) while the voltage is measured across the other two opposing electrodes (e.g., second electrode 414 and fourth electrode 418). Therefore, by biasing strain gauge sensor 410 with an external voltage and measuring the voltage across piezoelectric sensor elements 420-423, the strain on strain gauge sensor 410 may be sensed.

Figure 5A:
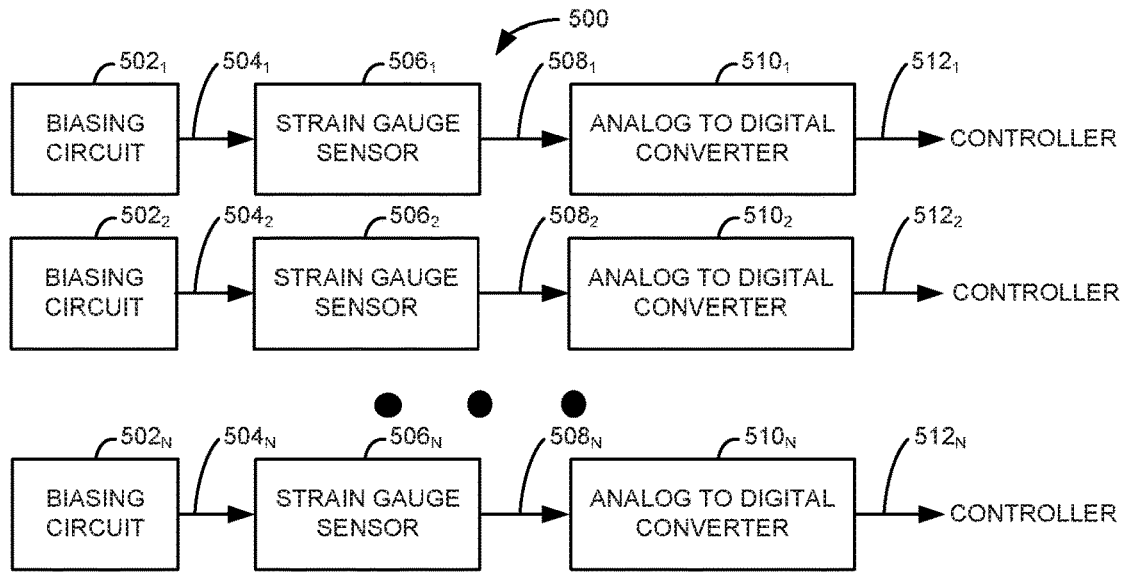
FIG. 5A is a block diagram illustrating one example of a circuit for processing signals from a plurality of strain gauge sensors.

FIG. 5A is a block diagram illustrating one example of a circuit 500 for processing signals from a plurality of strain gauge sensors. Circuit 500 includes biasing circuits $502_1$ to $502_N$, strain gauge sensors $506_1$ to $506_N$, and analog to digital converters $510_1$ to $510_N$, where "N" is any suitable number of strain gauge sensors on a fluid ejection die. The signals from each strain gauge sensor are passed to a controller, such as controller 18 previously described and illustrated with reference to FIG. 1A or electronic controller 120 previously described and illustrated with reference to FIG. 1B. Strain gauge sensors $506_1$ to $506_N$ are integrated on a fluid ejection die, such as fluid ejection die 200 previously described and illustrated with reference to FIG. 2 or fluid ejection die 300 previously described and illustrated with reference to FIG. 3. Biasing circuits $502_1$ to $502_N$ and analog to digital converters $510_1$ to $510_N$ may be integrated in the fluid ejection die, in a printhead assembly, in other components of the fluid ejection system, or in a combination thereof.

Each biasing circuit $502_1$ to $502_N$ is electrically coupled to a strain gauge sensor $506_1$ to $506_N$ through a signal path $504_1$ to $504_N$, respectively. Each strain gauge sensor $506_1$ to $506_N$ is electrically coupled to an analog to digital converter $510_1$ to $510_N$ through a signal path $508_1$ to $508_N$, respectively. Each analog to digital converter $510_1$ to $510_N$ is electrically coupled to the controller through a signal path $512_1$ to $512_N$, respectively.

Each biasing circuit $502_1$ to $502_N$ provides a biasing voltage or current to a corresponding strain gauge sensor $506_1$ to $506_N$. Each strain gauge sensor $506_1$ to $506_N$ may be provided by a strain gauge sensor 400 previously described and illustrated with reference to FIG. 4A or a strain gauge sensor 410 previously described and illustrated with reference to FIG. 4B. The voltage signal (i.e., analog output) from each strain gauge sensor $506_1$ to $506_N$ is converted to a digital signal by a corresponding analog to digital converter $510_1$ to $510_N$. The digital signal corresponding to the sensed strain of each strain gauge sensor $506_1$ to $506_N$ is then passed to the controller. In this way, the strain of each strain gauge sensor may be sensed simultaneously.

Figure 5B:
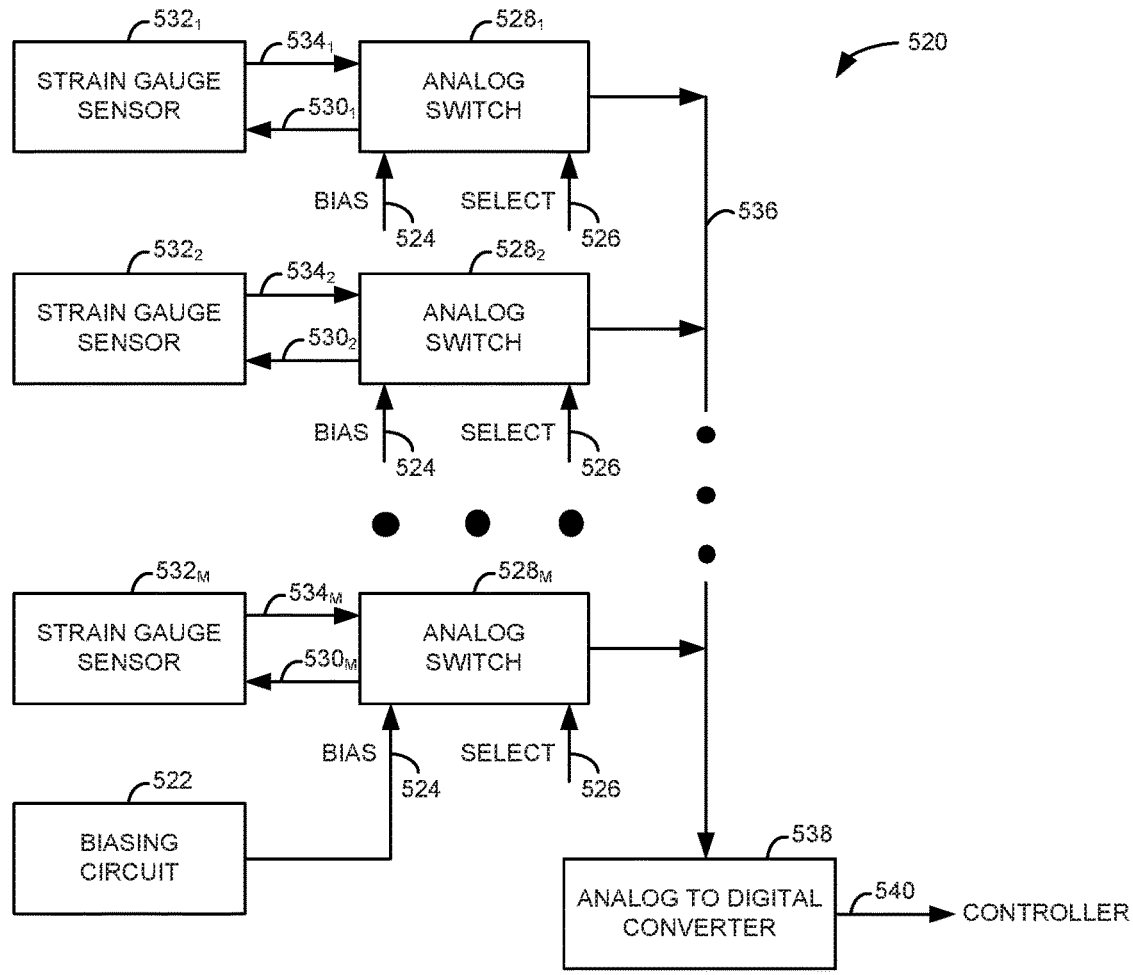
FIG. 5B is a block diagram illustrating another example of a circuit for processing signals from a plurality of strain gauge sensors.

FIG. 5B is a block diagram illustrating another example of a circuit 520 for processing signals from a plurality of strain gauge sensors. Circuit 520 includes a biasing circuit 522, a multiplexer including analog switches $528_1$ to $528_M$, strain gauge sensors $532_1$ to $532_M$, and an analog to digital converter 538, where "M" is any suitable number of strain gauge sensors on a fluid ejection die. The signals from each strain gauge sensor are passed to a controller, such as controller 18 previously described and illustrated with reference to FIG. 1A or electronic controller 120 previously described and illustrated with reference to FIG. 1B. Strain gauge sensors $532_1$ to $532_M$ are integrated on a fluid ejection die, such as fluid ejection die 200 previously described and illustrated with reference to FIG. 2 or fluid ejection die 300 previously described and illustrated with reference to FIG. 3. Biasing circuit 522, analog switches $528_1$ to $528_M$, and analog to digital converter 538 may be integrated in the fluid ejection die, in a printhead assembly, in other components of the fluid ejection system, or in a combination thereof.

Biasing circuit 522 is electrically coupled to each analog switch $528_1$ to $528_M$ through a signal path 524. Each analog switch $528_1$ to $528_M$ also receives a select signal through a signal path 526. Each analog switch $528_1$ to $528_M$ is electrically coupled to a strain gauge sensor $532_1$ to $532_M$ through a signal path $530_1$ to $530_M$, respectively. Each strain gauge sensor $532_1$ to $532_M$ is electrically coupled to an analog switch $528_1$ to $528_M$ through a signal path $534_1$ to $534_M$, respectively. Each analog switch $528_1$ to $528_M$ is electrically coupled to analog to digital converter 538 through a signal path 536. Analog to digital converter 538 is electrically coupled to the controller through a signal path 540.

Biasing circuit 522 provides a biasing voltage or current to each analog switch $528_1$ to $528_M$. In response to the select signal on signal path 526 corresponding to an analog switch $528_1$ to $528_M$, the selected analog switch $528_1$ to $528_M$ passes the biasing voltage or current to the corresponding strain gauge sensor $532_1$ to $532_M$ through the corresponding signal path $530_1$ to $530_M$. Each strain gauge sensor $532_1$ to $532_M$ may be provided by a strain gauge sensor 400 previously described and illustrated with reference to FIG. 4A or a strain gauge sensor 410 previously described and illustrated with reference to FIG. 4B. The voltage signal (i.e., analog output) from the selected strain gauge sensor $532_1$ to $532_M$ is passed to the selected analog switch $528_1$ to $528_M$ through the corresponding signal path $534_1$ to $534_M$. The selected analog switch $528_1$ to $528_M$ then passes the voltage signal to analog to digital converter 538. Analog to digital converter 538 converts the voltage signal to a digital signal. The digital signal corresponding to the sensed strain of the selected strain gauge sensor $532_1$ to $532_M$ is then passed to the controller. In this way, a single biasing circuit and a single analog to digital converter may be used to sense the strain of multiple strain gauge sensors by sensing the strain of one strain gauge sensor at a time.

Figure 6:
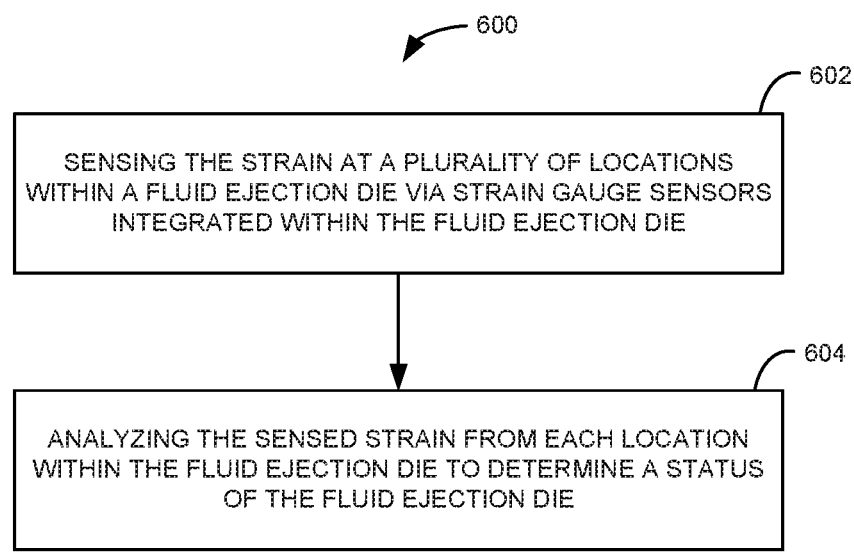
FIG. 6 is a flow diagram illustrating one example of a method for maintaining a fluid ejection system.

FIG. 6 is a flow diagram illustrating one example of a method 600 for maintaining a fluid ejection system. At 602, method 600 includes sensing the strain at a plurality of locations within a fluid ejection die via strain gauge sensors integrated within the fluid ejection die. At 604, method 600 includes analyzing the sensed strain from each location within the fluid ejection die to determine a status of the fluid ejection die. In one example, sensing the strain includes simultaneously sensing the strain at the plurality of locations within the fluid ejection die. In another example, sensing the strain includes sensing the strain at each location within the fluid ejection die one at a time. Sensing the strain may also include sensing the strain around both ends of a slot to deliver fluid within the fluid ejection die. Further, sensing the strain may include sensing the strain proximate bond pads of the fluid ejection die.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fluid ejection system comprising:
a fluid ejection die comprising a plurality of nozzles to eject fluid drops, a plurality of strain gauge sensors integrated within the fluid ejection die to sense strain within the fluid ejection die, and at least one biasing circuit integrated within the fluid ejection die to bias the plurality of strain gauge sensors; and
a controller to receive the sensed strain from each strain gauge sensor to determine a status of the fluid ejection die,
wherein each strain gauge sensor of the plurality of strain gauge sensors does not correspond to a specific nozzle of the plurality of nozzles.

2. The fluid ejection system of claim 1, wherein the plurality of nozzles are arranged in at least one column, and
wherein the plurality of strain gauge sensors are arranged in at least one column parallel to the at least one column of nozzles.

3. The fluid ejection system of claim 1, wherein the plurality of nozzles are arranged in at least two columns, and
wherein the plurality of strain gauge sensors are arranged in at least one column between the at least two columns of nozzles.

4. The fluid ejection system of claim 1, wherein the fluid ejection die comprises a slot to deliver fluid to the plurality of nozzles,
wherein the plurality of strain gauge sensors comprise a first plurality of strain gauge sensors surrounding a first end of the slot and a second plurality of strain gauge sensors surrounding a second end of the slot.

5. The fluid ejection system of claim 1, wherein the fluid ejection die comprises a plurality of bond pads,
wherein the plurality of strain gauge sensors are proximate the plurality of bond pads.

6. A fluid ejection system comprising:
a fluid ejection die comprising a plurality of nozzles to eject fluid drops, a plurality of strain gauge sensors integrated within the fluid ejection die to sense strain at various locations within the fluid ejection die, and at least one biasing circuit integrated within the fluid ejection die to bias the plurality of strain gauge sensors; and
a controller to receive the sensed strain from each strain gauge sensor to determine a strain profile of the fluid ejection die,
wherein the plurality of strain gauge sensors do not overlap the plurality of nozzles in a plan view of the fluid ejection die.

7. The fluid ejection system of claim 6, further comprising:
a plurality of biasing circuits, each biasing circuit to bias a strain gauge sensor; and
a plurality of analog to digital converters, each analog to digital converter to convert the analog output of a strain gauge sensor to a digital value.

8. The fluid ejection system of claim 6, further comprising:
a plurality of analog switches, each analog switch to select a corresponding strain gauge sensor; and
an analog to digital converter to convert the analog output of a selected strain gauge sensor to a digital value.

9. The fluid ejection system of claim 6, wherein the fluid ejection die comprises a silicon die, and
wherein each strain gauge sensor comprises a piezoelectric sensor element.

10. The fluid ejection system of claim 6, wherein each strain gauge sensor comprises four piezoelectric sensor elements in a Wheatstone bridge configuration.

11. A method for maintaining a fluid ejection system, the method comprising:
sensing the strain at a plurality of locations within a fluid ejection die via strain gauge sensors integrated within the fluid ejection die that do not correspond to specific nozzles of the fluid ejection die, the strain gauge sensors biased by at least one biasing circuit integrated within the fluid ejection die; and
analyzing the sensed strain from each location of the plurality of locations within the fluid ejection die to determine a status of the fluid ejection die.

12. The method of claim 11, wherein sensing the strain comprises simultaneously sensing the strain at the plurality of locations within the fluid ejection die.

13. The method of claim 11, wherein sensing the strain comprises sensing the strain at each location within the fluid ejection die one at a time.

14. The method of claim 11, wherein sensing the strain comprises sensing the strain around both ends of a slot to deliver fluid within the fluid ejection die.

15. The method of claim 11, wherein sensing the strain comprises sensing the strain proximate bond pads of the fluid ejection die.

16. The fluid ejection system of claim 1, wherein the plurality of nozzles are arranged in two columns, and
wherein the plurality of strain gauge sensors are arranged in three columns.

17. The fluid ejection system of claim 1, wherein the fluid ejection die comprises a first plurality of bond pads at a first end of the fluid ejection die and a second plurality of bond pads at a second end of the fluid ejection die opposite to the first end, and
wherein the plurality of strain gauge sensors are proximate the first plurality of bond pads and the second plurality of bond pads.

18. The fluid ejection system of claim 1, wherein the fluid ejection die comprises a different number of nozzles than strain gauge sensors.

19. The fluid ejection system of claim 6, wherein the strain profile indicates a fluid ejection die flatness or fragility.

20. The fluid ejection system of claim 11, wherein analyzing the sensed strain from each location within the fluid ejection die comprises determining a strain profile or stress signature of the fluid ejection die indicating a fluid ejection die flatness or fragility.

\* \* \* \* \*